US007561721B2

(12) United States Patent
Miyahara

(10) Patent No.: US 7,561,721 B2
(45) Date of Patent: Jul. 14, 2009

(54) SYSTEM AND METHOD FOR RANGE MEASUREMENT OF A PRECEDING VEHICLE

(75) Inventor: Shunji Miyahara, Yokohama (JP)

(73) Assignee: Visteon Global Technologies, Inc., Van Buren Township, MI (US)

( * ) Notice: Subject to any disclaimer, the term of this patent is extended or adjusted under 35 U.S.C. 154(b) by 852 days.

(21) Appl. No.: 11/049,502

(22) Filed: Feb. 2, 2005

(65) Prior Publication Data

US 2006/0182313 A1 Aug. 17, 2006

(51) Int. Cl.
*G06K 9/00* (2006.01)
(52) U.S. Cl. .................................. 382/104; 382/106
(58) Field of Classification Search .............. 382/104, 382/106, 199; 348/140, 148, 149; 340/937; 701/116, 117, 300, 301
See application file for complete search history.

(56) References Cited

U.S. PATENT DOCUMENTS

| | | | |
|---|---|---|---|
| 4,556,986 A | 12/1985 | Craig | 382/42 |
| 4,669,054 A | 5/1987 | Schlunt et al. | 364/822 |
| 4,695,959 A | 9/1987 | Lees et al. | 364/458 |
| 4,931,937 A * | 6/1990 | Kakinami et al. | 364/424.01 |
| 4,970,653 A | 11/1990 | Kenue | 364/461 |
| 5,173,949 A | 12/1992 | Peregrim et al. | 382/48 |
| 5,402,118 A | 3/1995 | Aoki | 340/937 |
| 5,487,116 A * | 1/1996 | Nakano et al. | 382/104 |
| 5,515,448 A | 5/1996 | Nishitani | 382/106 |
| 5,555,312 A | 9/1996 | Shima et al. | 382/104 |
| 5,555,555 A | 9/1996 | Sato et al. | 382/104 |
| 5,557,323 A | 9/1996 | Kajiwara | 348/140 |

(Continued)

FOREIGN PATENT DOCUMENTS

DE 100 29 866 A1 2/2001

(Continued)

OTHER PUBLICATIONS

T. Kato, Y. Ninomiya and I. Masaki, An Obstacle Detection Method by Fusion of Radar and Motion Stereo, IEEE Intelligent Vehicles Symposium 2001, pp. 37-42, 2001.

(Continued)

*Primary Examiner*—Andrew W Johns
(74) *Attorney, Agent, or Firm*—Brinks Hofer Gilson & Lione

(57) ABSTRACT

A system for determining range and lateral position of a vehicle is provided. The system includes a camera and a processor. The camera is configured to view a region of interest including the vehicle and generate an electrical image of the region. The processor is in electrical communication with the camera to receive the electrical image. The processor analyzes the image by identifying a series of windows within the image each window corresponds to features of the vehicle at a different target range. For example, from the perspective of the camera the vehicle will appear larger when it is closer to the camera than if it is further away from the camera. Accordingly, each window is sized proportional to the vehicle as it would appear at each target range. The processor evaluates characteristics in the electrical image within each window to identify the vehicle. A score is determined indicating the likelihood that certain characteristics of the electrical image actually correspond to the vehicle and also that the vehicle is at target range for that window.

22 Claims, 6 Drawing Sheets

U.S. PATENT DOCUMENTS

| | | | |
|---|---|---|---|
| 5,646,612 A | 7/1997 | Byon | 340/903 |
| 5,757,287 A | 5/1998 | Kitamura et al. | 340/937 |
| 5,850,254 A | 12/1998 | Takano et al. | 348/148 |
| 5,887,080 A | 3/1999 | Tsubusaki et al. | 382/172 |
| 5,930,383 A | 7/1999 | Netzer | 382/154 |
| 5,937,079 A | 8/1999 | Franke | 382/103 |
| 6,021,209 A | 2/2000 | Hirabayashi et al. | 382/103 |
| 6,205,234 B1 | 3/2001 | Kakinami et al. | 382/104 |
| 6,285,393 B1 | 9/2001 | Shimoura et al. | 348/119 |
| 6,295,083 B1 | 9/2001 | Kuhn | 348/190 |
| 6,327,536 B1 | 12/2001 | Tsuji et al. | 701/301 |
| 6,430,303 B1 | 8/2002 | Naoi et al. | 382/104 |
| 6,445,809 B1 | 9/2002 | Sasaki et al. | 382/104 |
| 6,463,369 B2 | 10/2002 | Sadano et al. | 701/28 |
| 6,470,271 B2 | 10/2002 | Matsunaga | 701/301 |
| 6,477,260 B1 | 11/2002 | Shimomura | 382/106 |
| 6,484,086 B2 | 11/2002 | Jeon | 701/93 |
| 6,535,114 B1 | 3/2003 | Suzuki et al. | 340/435 |
| 6,590,521 B1 | 7/2003 | Saka et al. | 342/70 |
| 6,665,439 B1 | 12/2003 | Takahashi | 382/199 |
| 6,687,386 B1 | 2/2004 | Ito et al. | 382/103 |
| 6,741,757 B1 | 5/2004 | Torr et al. | 382/294 |
| 6,754,369 B1 | 6/2004 | Sazawa | 382/105 |
| 6,760,061 B1 | 7/2004 | Glier et al. | 348/149 |
| 6,775,395 B2 | 8/2004 | Nishigaki et al. | 382/104 |
| 6,822,563 B2 | 11/2004 | Bos et al. | 340/461 |
| 6,823,261 B2 | 11/2004 | Sekiguchi | 701/301 |
| 6,834,232 B1 | 12/2004 | Malhotra | 701/301 |
| 6,865,296 B2 | 3/2005 | Nagao | 382/209 |
| 6,879,249 B2 | 4/2005 | Takahashi | 340/435 |
| 6,909,802 B2 | 6/2005 | Nakamura | 382/154 |
| 6,927,758 B1 | 8/2005 | Piot et al. | 345/166 |
| 6,985,075 B2 | 1/2006 | Takeda | 340/435 |
| 7,042,389 B2 | 5/2006 | Shirai | 342/70 |
| 7,231,288 B2 | 6/2007 | Koulinitch | 701/96 |
| 2002/0001398 A1 | 1/2002 | Shimano et al. | 382/104 |
| 2002/0005778 A1 | 1/2002 | Breed et al. | 340/435 |
| 2002/0131620 A1 | 9/2002 | Shirato | 382/104 |
| 2002/0131621 A1 | 9/2002 | Ohta | 382/104 |
| 2002/0134151 A1 | 9/2002 | Naruoka et al. | 73/291 |
| 2002/0191837 A1 | 12/2002 | Takeda et al. | 382/154 |
| 2003/0001732 A1 | 1/2003 | Furusho | 340/435 |
| 2003/0011509 A1 | 1/2003 | Honda | 342/70 |
| 2003/0039546 A1 | 2/2003 | Liu | 415/213.1 |
| 2003/0076414 A1 | 4/2003 | Sato et al. | 348/148 |
| 2003/0081815 A1 | 5/2003 | Shima et al. | 382/106 |
| 2003/0091228 A1 | 5/2003 | Nagaoka et al. | 382/154 |
| 2003/0099400 A1 | 5/2003 | Ishikawa | 382/190 |
| 2003/0108222 A1 | 6/2003 | Sato et al. | 382/104 |
| 2003/0125855 A1 | 7/2003 | Breed et al. | 701/36 |
| 2003/0128273 A1 | 7/2003 | Matsui et al. | 348/51 |
| 2003/0198389 A1 | 10/2003 | Wenzel et al. | 382/218 |
| 2003/0235327 A1 | 12/2003 | Srinivasa | 382/104 |
| 2004/0016870 A1 | 1/2004 | Pawlicki et al. | 250/208.1 |
| 2004/0054473 A1 | 3/2004 | Shimomura | 701/301 |
| 2004/0057601 A1 | 3/2004 | Honda | 382/104 |
| 2004/0062420 A1 | 4/2004 | Rohaly | 382/107 |
| 2004/0096082 A1 | 5/2004 | Nakai et al. | 382/104 |
| 2004/0175019 A1 | 9/2004 | Howard | 382/103 |
| 2004/0183906 A1 | 9/2004 | Nagaoka et al. | 348/148 |
| 2004/0189512 A1 | 9/2004 | Takashima et al. | 342/70 |
| 2004/0234136 A1 | 11/2004 | Zhu et al. | 382/224 |
| 2004/0252863 A1 | 12/2004 | Chang et al. | 382/104 |
| 2005/0001715 A1 | 1/2005 | Itoh et al. | 340/435 |
| 2005/0015201 A1 | 1/2005 | Fields et al. | 701/301 |
| 2005/0036660 A1 | 2/2005 | Otsuka et al. | 382/104 |
| 2005/0063565 A1 | 3/2005 | Nagaoka et al. | 382/104 |
| 2005/0190972 A1 | 9/2005 | Thomas et al. | 382/218 |
| 2005/0271254 A1 | 12/2005 | Hougen | 382/104 |
| 2006/0002587 A1 | 1/2006 | Takahama et al. | 382/103 |
| 2006/0200307 A1 | 9/2006 | Riess | 701/207 |
| 2007/0031008 A1 | 2/2007 | Miyahara | 382/106 |
| 2007/0035384 A1 | 2/2007 | Belcher et al. | 340/425.5 |
| 2007/0171033 A1 | 7/2007 | Nagaoka et al. | 340/435 |

FOREIGN PATENT DOCUMENTS

| | | |
|---|---|---|
| EP | 0 626 655 A2 | 11/1994 |
| EP | 1 179 803 A2 | 2/2002 |
| JP | 3170012 A | 7/1991 |
| JP | 5020593 A | 1/1993 |
| JP | 05-100278 A | 4/1993 |
| JP | 5313736 A | 11/1993 |
| JP | 8083392 A | 3/1996 |
| JP | 9016782 A | 1/1997 |
| JP | 10-255019 A | 9/1998 |

OTHER PUBLICATIONS

Y. Fang, I. Masaki, B. Horn, Distance Range Based Segmentation in Intelligent Transportation Systems: Fusion of Radar and Binocular Stereo, pp. 171-176, 2001.

H. Higashida, R. Nakamura, M. Hitotsuya, K.F. Honda and N. Shima, Fusion Sensor for an Assist System or Low Speed in Traffic Congestion Using Millimeter-Wave and an Image Recognition Sensor, SAE Technical Paper Series, 2001-01-0880, 2001, pp. 1-5.

Detection and Classification of Vehicles, Surendra Gupte, Osama Masoud, Robert F.K. Martin, Nikolaos P. Papanikolopoulous, IEEE Transactions on Intelligent Transportation Systems, vol. 3, No. 1, Mar. 2002, pp. 37-47.

Detection and Avoidance of Simulated Potholes in Autonomous Vehicle Navigation in an Unstructured Environment, Jaiganesh Karuppuswamy, Vishnuvardhanaraj Selvaraj, Meyyappa Murugappa Ganesh and Ernest L. Hall, Center for Robotics Research, University of Cincinnati, 2000.

Stereo Vision-based Vehicle Detection, M. Bertozzi, A. Broggi, A. Fascioli, S. Nichele, IEEE Intelligent Vehicles Symposium, Oct. 3-5, 2002, pp. 39-44.

"Obstacle Detection for Road Vehicles", Jorg Schutte, date unknown.

"Use of Video Technology to Improve Automotive Safety Becomes More Feasible with Blackfin Processors", Source(s): http://www.analog.com/library/analogDialogue/archives/38-03/auto_safety.html, Mar. 2004.

Leeuweb et al., Vehicle Detection with a Mobile Camera, IEEE Robotics and Automation Magazine, Mar. 2005, pp. 37-43.

Sotelo et al., Road Vehicle Recognition in Monocular Images, IEEE ISIE 2005, Jun. 20-23, pp. 1471-1476.

Dagan et al., Forward Collision Warning with a Single Camera, IEEE Intelligent Vehicles Symposium, Jun. 14-17, 2004, pp. 37-42.

Stein et al., Vision-based ACC with a single camera: bounds on range and range rate accuracy, IEEE Intelligent Vehicles Symposium 2003, Jun. 9-11, 2003, pp. 120-125.

"*Technology to Integrate a Vehicle-Mounted Camera and Image Processing Unit*", Yoshiyuki Fukii, Hideki Tsukaoka, Jun. 221, pp. 14-17.

Mori et al. Shadow and Rhythm as Signs patterns of Obstacle Detection, 1993, IEEE International Symposium on Industrial Electronics, Conference Proceedings ISIE '93, pp. 271-277.

U.S. Patent and Trademark Office Action, U.S. Appl. No. 11/195,427, Dated Dec. 31, 2008.

U.S. Patent and Trademark Final Office Action, U.S. Appl. No. 10/836,501, Dated Dec. 23, 2008.

"Vision-Based Navigation of Mobile Robot with Obstacle Avoidance by Single Camera Vision and Ultrasonic Sensing", A. Ohya, A. Kosaka and A. Kak, 1997, pp. 704-711.

"Forward Collision Warning with a Single Camera", E. Dagan, O. Mano, G. Stein, A. Shashua, 2004 IEEE, pp. 37-42.

"Vision-based ACC with a Single Camera: Bounds on Range and Range Rate Accuracy", G. Stein, O. Mano, A. Shashua, 2003 IEEE, pp. 120-125.

German Office Action Date Stamped Jan. 19, 2009.

United States Patent and Trademark Office Action Dated Dec. 9, 2008.

\* cited by examiner

SYSTEM AND METHOD FOR RANGE MEASUREMENT OF A PRECEDING VEHICLE

BACKGROUND

1. Field of the Invention

The present invention generally relates to a system and method for range and lateral position measurement of a preceding vehicle on the road.

2. Description of Related Art

Radar and stereo camera systems for adaptive cruise control (ACC), have been already introduced into the market. Recently, radar has been applied to for pre-crash safety systems and collision avoidance. Typically, the range and lateral position measurement of a preceding vehicle is accomplished utilizing radar and/or stereo camera systems. Radar systems can provide a very accurate range. However, millimeter wave type radar systems such as 77 Ghz systems are typically quite expensive. Laser radar is low cost, but requires mechanical scanning. Further, radar, is generally, not well suited to identify the object and give an accurate lateral position.

Stereo cameras can determine the range and identity of an object. However, these systems are expensive and typically difficult to manufacture due to the accurate alignment required between the two stereo cameras and requires two image processors.

In view of the above, it can be seen that conventional ACC systems typically do not have a high cost-performance ratio even though they may perform to the desired functional requirements. Further, it is apparent that there exists a need for an improved system and method for measuring the range and lateral position of the preceding vehicle.

SUMMARY

In satisfying the above need, as well as, overcoming the enumerated drawbacks and other limitations of the related art, the present invention provides a system for determining range and lateral position of a vehicle. The primary components of the system include a camera and a processor. The camera is configured to view a region of interest containing a preceding vehicle and generate an electrical image of the region. The processor is in electrical communication with the camera to receive the electrical image. To analyze the electrical image, the processor identifies a series of windows within the image, each window corresponding to a fixed physical size at a different target range. Accordingly, each windows size in the image is inversely proportional to the range of the window. The processor evaluates characteristics of the electrical image within each window to identify the vehicle. For example, the size of the vehicle is compared to the size of each window to create a size ratio. The characteristics of electrical image evaluated by the processor include the width and height of edge segments in the image, as well as, the height, width, and location of objects constructed from multiple edge segments. To analyze the objects, the width of the object is determined and a vehicle model is selected for the object from several models corresponding to a vehicle type, such as a motorcycle, sedan, bus, etc. The model provides the object a score on the basis of the characteristics. The scoring of the object characteristics is performed according to the vehicle model selected. The score indicates the likelihood that the object is a target vehicle on the road. The object with the highest score becomes a target and the range of the window corresponding to the object will be the estimated range of the preceding vehicle.

In yet another aspect of the present invention, a method is provided for identifying the vehicle within the electrical image and determining the vehicle range. To simplify the image, an edge enhanced algorithm is applied to the image. Only characteristics of the electrical image within a particular window are evaluated. The edge enhanced image is processed to generate a trinary image where picture elements of the image are designated as positive edge, negative edge, or non-edge elements. The positive and negative edge elements are grouped into positive edge segments and negative edge segments. The segments are evaluated and objects are constructed from pairs of positive and negative edge segments. A score is determined for each object based on criteria, such as, the object width, object height position, object height, and segment width. Based on the score of the object, the range of the object is estimated on the basis of the target range of the window.

In another aspect of the present invention, the original image is binarized and the binary elements located in the object region and a ground region are used to calculate the uniformity of both the object region and the ground region. The uniformity measure of the object region and the ground region are used to evaluate whether it is a real object or ghost object.

Further objects, features and advantages of this invention will become readily apparent to persons skilled in the art after a review of the following description, with reference to the drawings and claims that are appended to and form a part of this specification.

DETAILED DESCRIPTION

Figure 1:
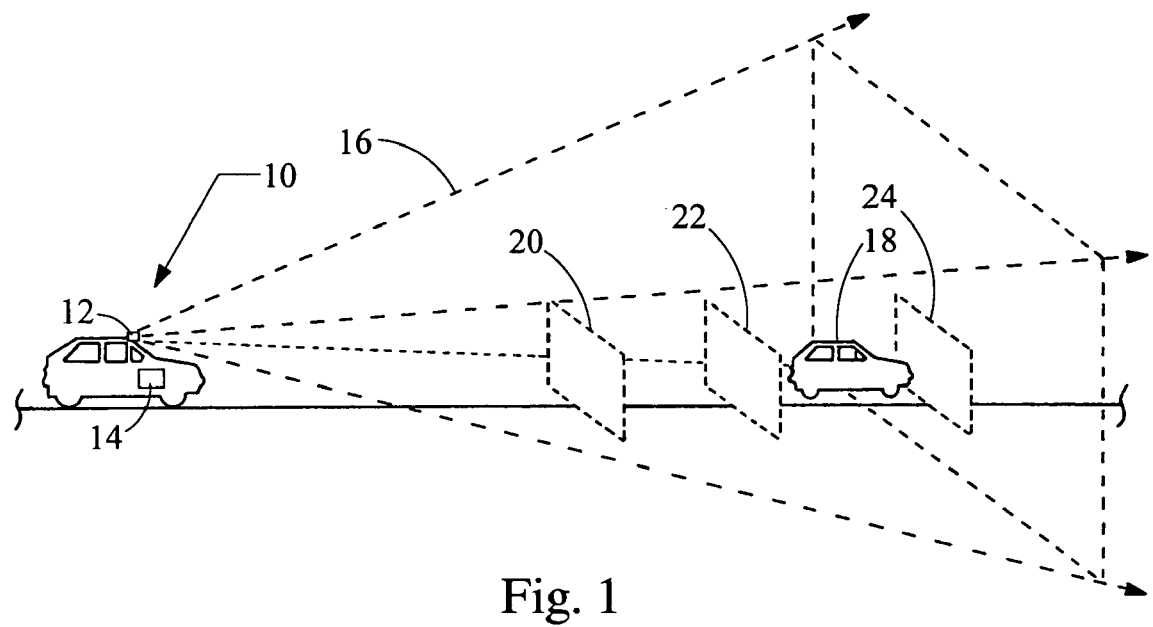
FIG. 1 is a side view of a system for range and lateral position measurement of a preceding vehicle, embodying the principles of the present invention.

Referring now to FIG. 1, a system embodying the principles of the present invention is illustrated therein and designated at 10. As its primary components, the system 10 includes a camera 12 and a processor 14. The camera 12 is located in the rearview mirror to collect an optical image of a region of interest 16 including a vehicle 18. The optical image received by the camera 12, is converted to an electrical image that is provided to the processor 14. To filter out unwanted distractions in the electronic image and aid in determining the range of the vehicle 18, the processor 14 calculates the position of multiple windows 20, 22, 24 within the region of interest 16. The windows 20, 22, 24 are located at varying target ranges from the camera 12. The size of the windows 20, 22, 24 are a predetermined physical size (about 4×2 m as shown) and may correspond to the size of a typical lane width and height of a vehicle. To provide increased resolution the windows 20, 22, 24 are spaced closer together and the number of windows is increased. Although the system 10, as shown, is configured to track a vehicle 18 preceding the system 10, it is fully contemplated that the camera 12 could be directed to the side or rear to track a vehicle 18 that may be approaching from other directions.

Figure 2:
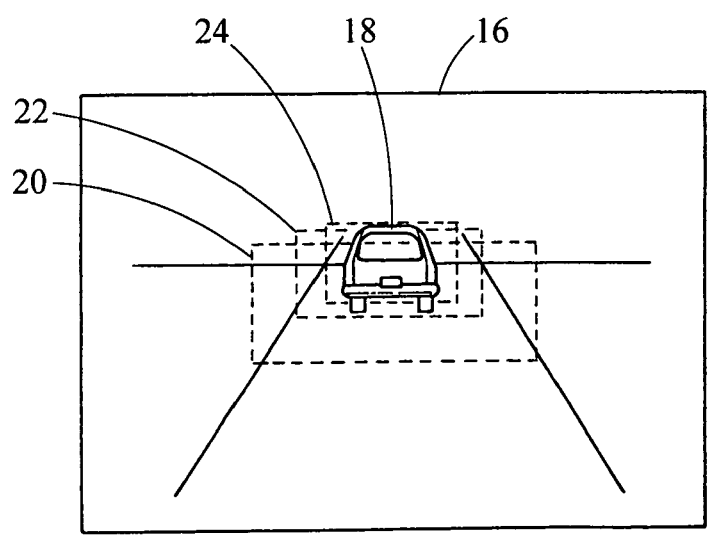
FIG. 2 is a view of an electronic image from the perspective of the camera in FIG. 1.

Now referring to FIG. 2, an electronic image of the region of interest 16 as viewed by the camera 12 is provided. The windows 20, 22, 24 are projected into their corresponding size and location according to the perspective of the camera 12. The vehicle 18 is located between windows 22 and 24, accordingly, the size of the vehicle 18 corresponds much more closely to the height and width of windows 22 and 24 than window 20. As can be seen from FIG. 1, although the size and width of the windows are physically constant at each target range, the window sizes appear to vary from the perspective of the camera 12. Similarly, the height and width of the preceding vehicle 18 will appear to vary at each target range. The perspective of the camera 12 will affect the apparent size and location of the preceding vehicle 18 within the electrical image based on the elevation angle and the azimuth angle of the camera 12. The processor 14 can use the location and size of each of the windows 20, 22, 24 to evaluate characteristics of the electrical image and determine a score indicating the probability the vehicle 18 is at the target range associated with a particular window.

Figure 3:
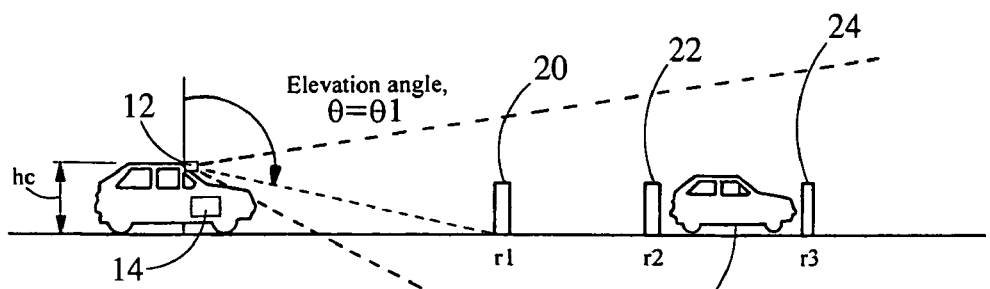
FIG. 3 is a side view of the system illustrating the calculation of the upper and lower edge of the windows in accordance with the present invention.

Now referring to FIG. 3, a side view of the system 10 is provided illustrating the use of the elevation angle in calculating the height and position of the window 20 within the electrical image. The elevation angle is the angle between the optical axis of the camera 12 and the surface of the road. The lower edge of window 20 is calculated based on Equation (1).

$$\theta_1 = a\tan(-r1/hc) \quad (1)$$

Where hc is the height of the camera 12 from the road surface, r1 is the horizontal range of window 20 from the camera 12, and the module are tangent is $[0, \Pi]$.

Similarly, the upper edge of the first window is calculated based on Equation (2).

$$\theta_{1h} = \text{arc tangent}(r1/(hw-hc)) \quad (2)$$

Where hw is the height of the window, hc is the height of the camera 12 from the road surface and r1 is the range of window 20 from the camera 12. The difference, $\Delta\theta_1 = \theta_1 - \theta_{1h}$, corresponds to the height of the window in the electronic image.

Figure 4:
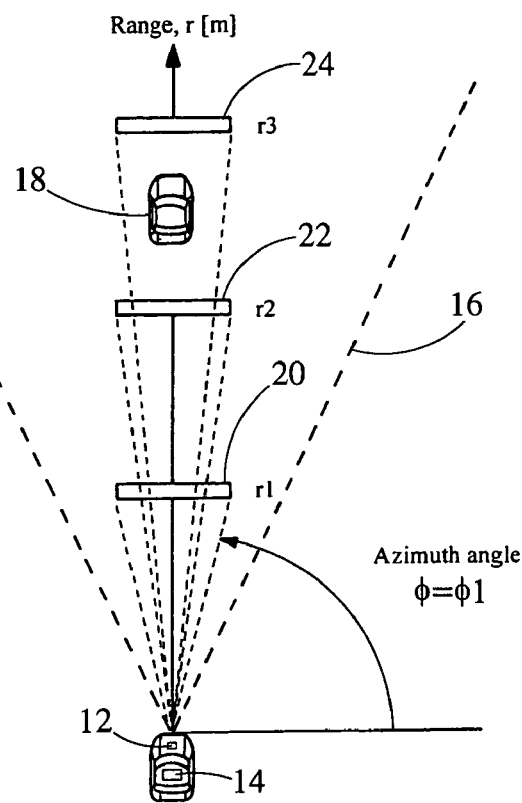
FIG. 4 is a top view of the system illustrating the calculation of the left and right edge of the windows, in accordance with the present invention.

Now referring to FIG. 4, the horizontal position of the window in the electronic image corresponds to the azimuth angle. The azimuth angle is the angle across the width of the preceding vehicle from the perspective of the camera 12. The right edge of the range window 20 is calculated according to Equation (3).

$$\phi_1 = \text{arc tangent}(-\text{width}\_w/(2*r1)) + (\Pi/2) \quad (3)$$

Similarly, the left edge of the range window 20 is calculated according to Equation (4).

$$\phi_{1h} = \text{arc tangent}(\text{width}\_w/(2*r1)) + (\Pi/2) \quad (4)$$

Where window w is the distance from the center of the window 20 to the horizontal edges, r1 is the horizontal range of the window 20 from the camera 12, and the module are tangent is $[-\Pi/2, \pi/2]$.

The window positions for the additional windows 22, 24 are calculated according to Equations (1)-(4), substituting their respective target ranges for r1.

Figure 5A:
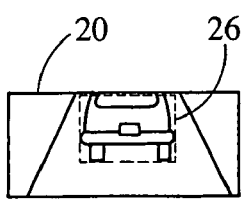
FIG. 5A is a view of the electronic image, with only the image information in the first window extracted.

Now referring to FIG. 5A, the electronic image is shown relative to window 20. Notice the width of the object 26 is about 30% of the width of the window 20. If the window width is set at a width of 4 m, about twice the expected width of the vehicle 18, the estimated width of the object 26 at a distance of r1 would equal 4×0.3=1.2 m. Therefore, the likelihood that the object 26 is the vehicle 18 at range r1 is low. In addition, the processor 14 evaluates vertical offset and object height criteria. For example, the distance of the object 26 from the bottom of the processing window 20 is used in determining likelihood that the object 26 is at the target range. Assuming a flat road, if the object 26 were at the range r1, the lowest position of the object 26 would appear at the bottom of the window 20 corresponding to being in contact with the road at the target range. However, the object 26 in FIG. 5A, appears to float above the road, thereby decreasing the likelihood it is located at the target range. Further, the extracted object 26 should cover a height of 0.5 m or 1.2 m. The processor 14 will detect an object height of 0.5 m if only the bottom portion of the vehicle 18 is detected or 1.2 m if the full height of the vehicle 18 is detected. The closer the height of the object 26 is to the expected height the more probable the object 26 is the vehicle 18 and the more probable it is located at the target range r1. The vertical offset, described above, may also affect the height of the object 26, as the top of the object, in FIG. 5A, is chopped off by the edge of the window 20. Therefore, the object 26 appears shorter than expected, again lowering the likelihood the object is the vehicle 18 at the range r1.

Figure 5B:
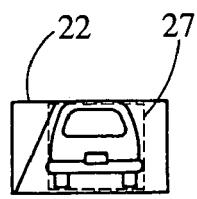
FIG. 5B is a view of the electronic image, with only the image information in the second window extracted.

Now referring to FIG. 5B, the electronic image is shown relative to window 22. The width of the object 27 is about 45% of the window 22. Therefore, the estimated width of the object 27 at range r2 is equal to 4×0.45-1.8 m much closer to the expected size of the vehicle 18. In this image, the object 27 is only slightly offset from the bottom of the window 22, and the entire height of the object 27 is still included in the window 22.

Figure 5C:
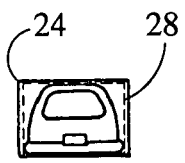
FIG. 5C is a view of the electronic image, with only the image information in the third window extracted.

Now referring to FIG. 5C, the electronic image is shown relative to window 24. The width of the object 28 is about 80% of the width of the window 24. Accordingly, the estimated width of the object 28 at range r3 is equal to 4×0.08=3.2 m. Therefore, the object width is significantly larger than the expected width of vehicle 18, usually about 1.75 m. Based on the object width, the processor 14 can make a determination that object 27 most probably corresponds to vehicle 18 and r2 is the most probable range. The range accuracy of the system 10 can be increased by using a finer pitch of target range for each window. Using a finer pitch between windows is especially useful as the vehicle 18 is closer to the camera 12, due to the increased risk of collision. Alternatively, interpolation may also be used to calculate a position between windows by identifying two most probable objects in successive windows, using the above mentioned criteria, and calculating a distance base on a weighting of each score and the corresponding target ranges.

Figure 6:
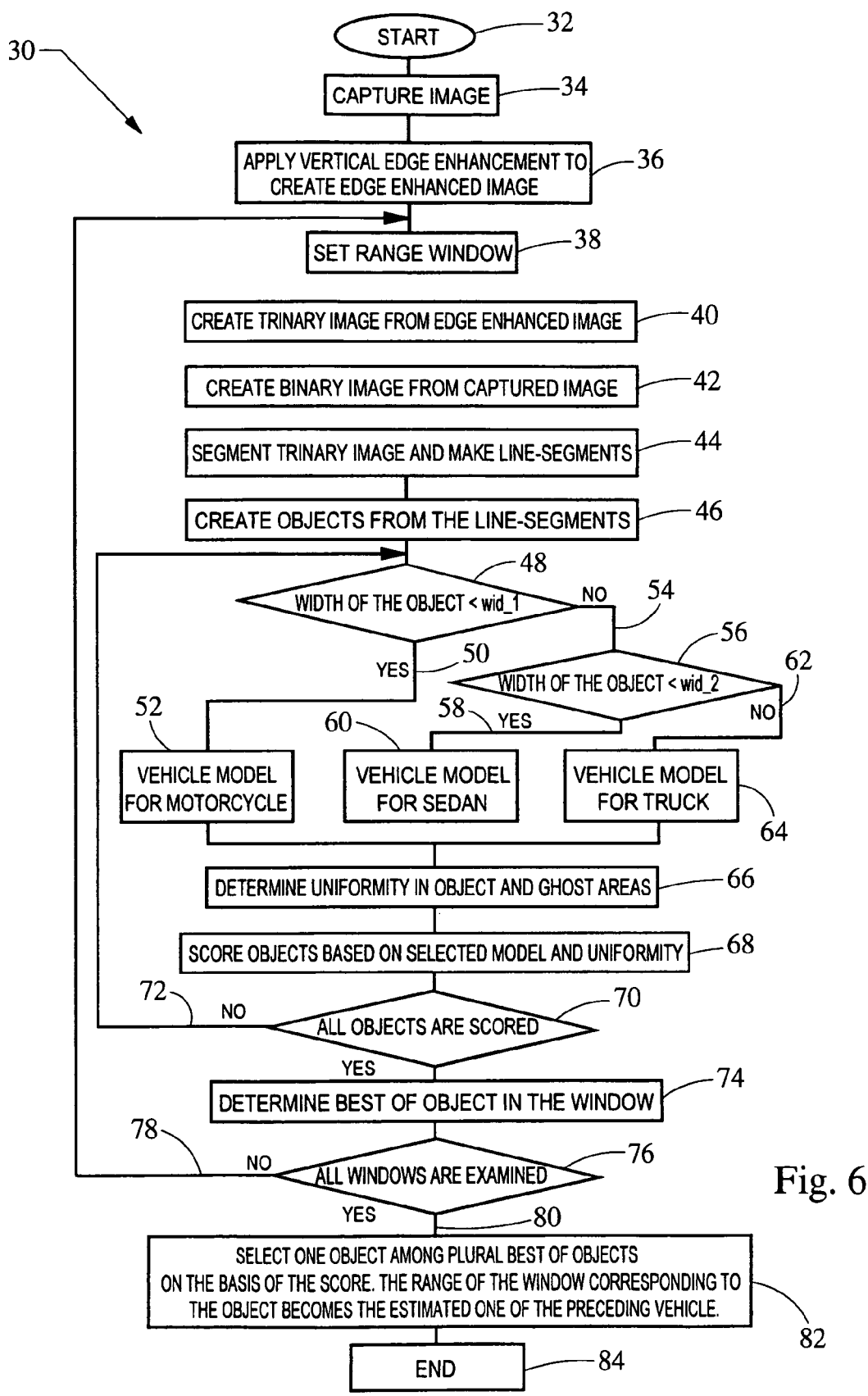
FIG. 6 is a flowchart illustrating the algorithm executed by the system to determine the range of the preceding vehicle.

Now referring to FIG. 6, a method for processing an image according to the present invention is provided at reference numeral 30. Block 32 denotes the start of the method. In block 34, an image is captured by the camera 12 and transferred to the processor 14. The processor 14 applies vertical edge enhancement to create an edge enhanced image as denoted by block 36. In block 38, the processor 14 sets a range window to limit the region analyzed for that specific range, thereby eliminating potentially confusing edge information. A trinary image is created within the range window from the edge enhanced image as denoted by block 40. In, block 42 a binary image is created from the electronic image, as originally captured. In block 44, the trinary image is segmented to sort pixels of the same value and a similar location into groups called line-segments. Two segments with different polarity are grouped together to form objects that correspond to a potential vehicle, as denoted in block 46.

In block 48, the width of an object is compared to a width threshold to select the model. If the width of the object is less than the width threshold, the algorithm follows line 50 to block 52 where a vehicle model corresponding to a motor cycle is selected. If the width of the object is not less than the first width threshold, the algorithm follows line 54 to block 56. In block 56, the width of the object is compared to a second width threshold. If the width of the object is less than the second width threshold, the algorithm follows line 58 and a vehicle model corresponding to a Sedan is selected, as denoted in block 60. However, if the width of the object is greater than the second width threshold, the algorithm follows line 62 to block 64 where a model corresponding to a truck is selected, as denoted in block 64.

In block 66, the processor 14 determines the uniformity in the object region and ghost region (below the object region) based on the binary image. If the similarities in the both regions are high, this object is judged as a non-object or ghost object. The processor then scores the objects based on the score of the selected model and the uniformity, as denoted by block 68. In block 70, the processor 14 determines if all the objects for that range window have been scored. If all the objects have not been scored, the algorithm follows line 72 and the width of the next object is analyzed to select a vehicle model starting at block 48. If all the objects have been scored, the best object in the window (object-in-window) is determined on the basis of the score, 74. Then the processor determines if all the windows have been completed, as denoted by block 76. If all the windows have not been completed, the algorithm follows line 78 and the window is changed. After the window is changed, the algorithm follows line 78 and the next range window is set as denoted by block 38. If all the windows have been completed, the best object is selected from the best objects-in-window on the basis of the score and the range of the window corresponding to the object becomes the estimated range of the preceding vehicle, 82, and the algorithm ends until the next image capture as denoted by block 84.

Figure 7:
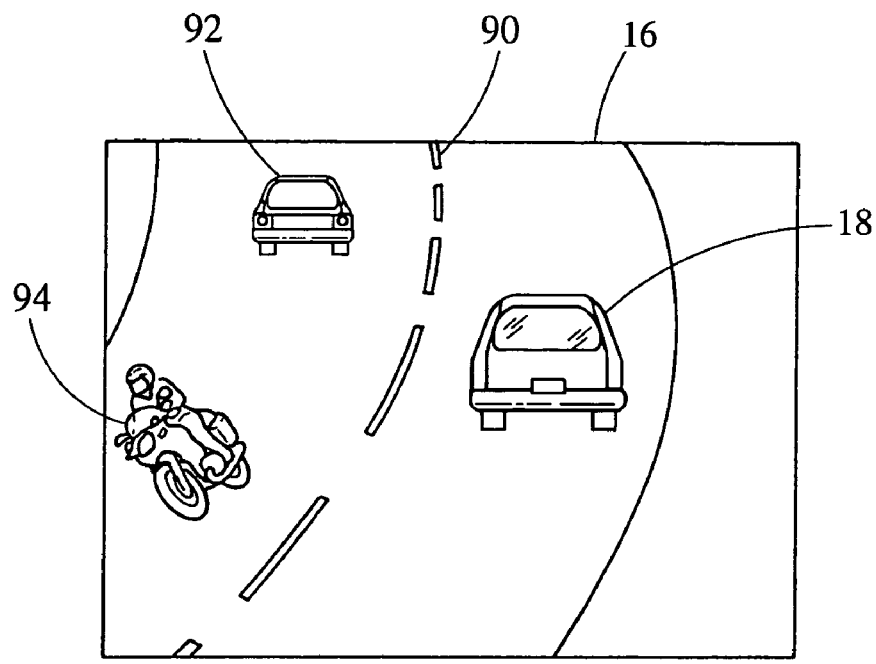
FIG. 7 is a view of an electronic image generated by the camera prior to processing.

Now referring to FIG. 7, a typical electronic image as seen by the camera 12 is provided and will be used to further describe the method implemented by the processor 14 to determine the range and lateral position of the vehicle 18. The electronic image includes additional features that could be confusing for the processor 14 such as the lane markings 30, an additional car 32, and a motorcycle 34.

Figure 8:
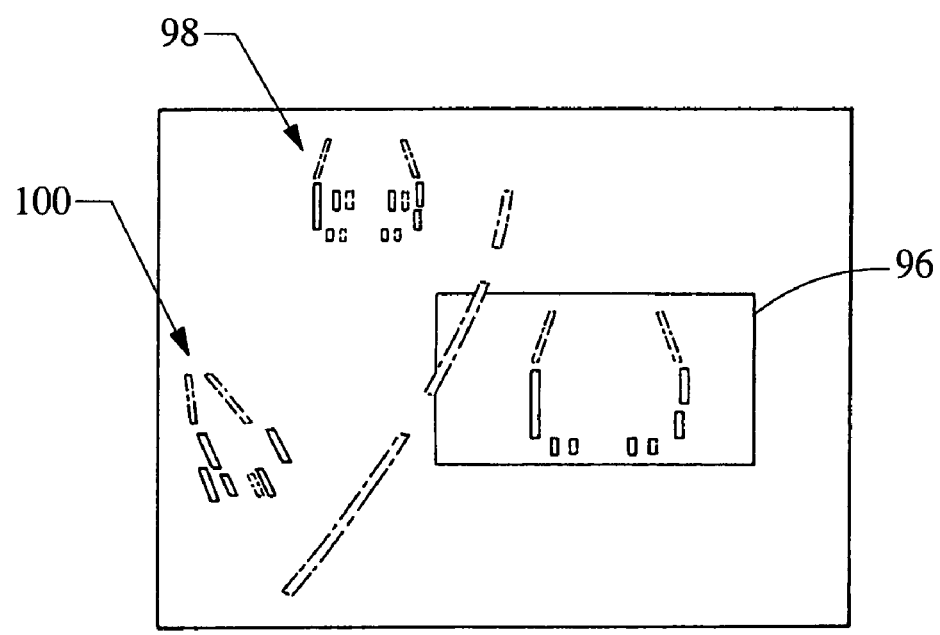
FIG. 8 is a view of the electronic image after a vertical edge enhancement algorithm has been applied to the electronic image.

FIG. 8 shows a vertically edge enhanced image. The electronic image is comprised of horizontal rows and vertical columns of picture elements (pixels). Each pixel contains a value corresponding to the brightness of the image at that row and column location. A typical edge enhancement algorithm includes calculating the derivative of the brightness across the horizontal rows or vertical columns of the image. However, many other edge enhancement techniques are contemplated and may be readily used. In addition, the position and size of the window 36 is calculated for a given target range. Edge information located outside the window 36 is ignored. In this instance, much of the edge enhanced information from the car 38 and the motorcycle 40 can be eliminated.

Figure 9:
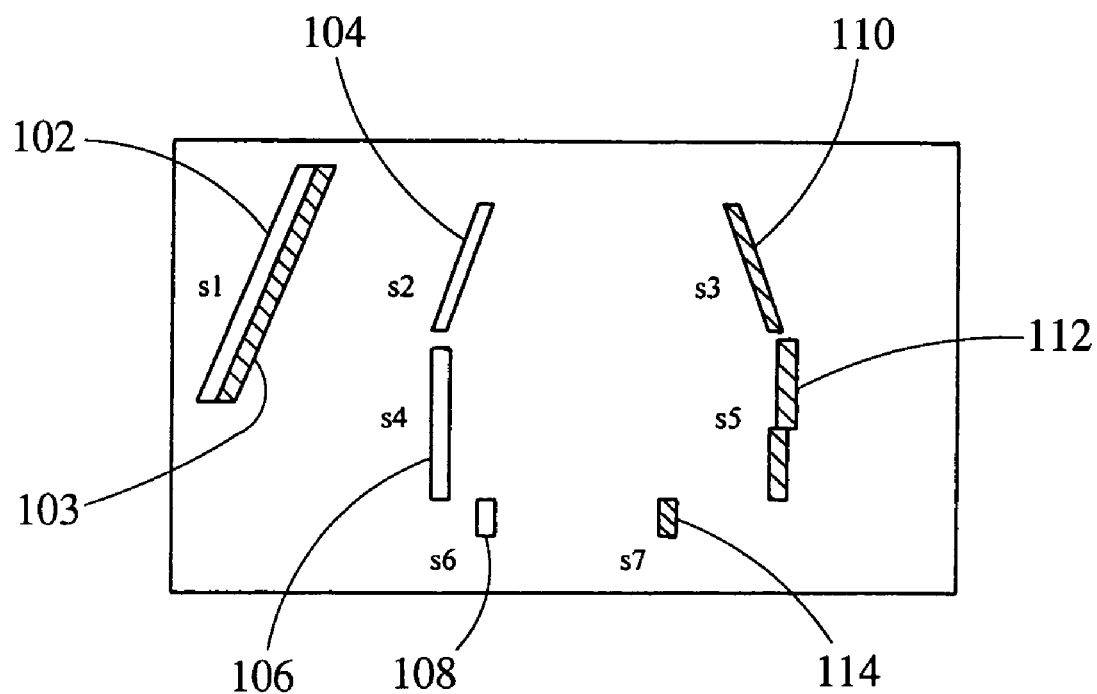
FIG. 9 is a view of the electronic image including segments that are extracted from the edge enhanced image.

Now referring to FIG. 9, the edge enhanced image is then trinarized, meaning each of the pixels are set to a value of 0, 1, or 2. A typical method for trinarizing the image includes taking the value of each pixel value and applying an upper and lower threshold value, where if the brightness of the pixel value is above the upper threshold value, the pixel value is set to 1. If the brightness of the pixel value is below the lower threshold value, the pixel value is set to 2. Otherwise, the pixel value is set to 0. This effectively separates the pixels into edge pixels with a bright to dark (negative) transition, edge pixels with a dark to bright (positive) transition, and non-edge pixels. Although, the above described method is fast and simple, other more complicated thresholding methods may be used including local area thresholding or other commonly used approaches. Next, the pixels are grouped based on their relative position to other pixels having the same value. Grouping of these pixels is called segmentation and each of the groups is referred to as a line-segment. Height, width and position information is stored for each line-segment.

Relating these segments back to the original image, Segment 42 represents the lane marking on the road. Segment 44 represents the upper portion of the left side of the vehicle. Segment 46 represents the lower left side of the vehicle. Segment 48 represents the left tire of the vehicle. Segment 50 represents the upper right side of the vehicle. Segment 52 represents the lower right side of the vehicle while segment 54 represents the right tire.

Figure 10:
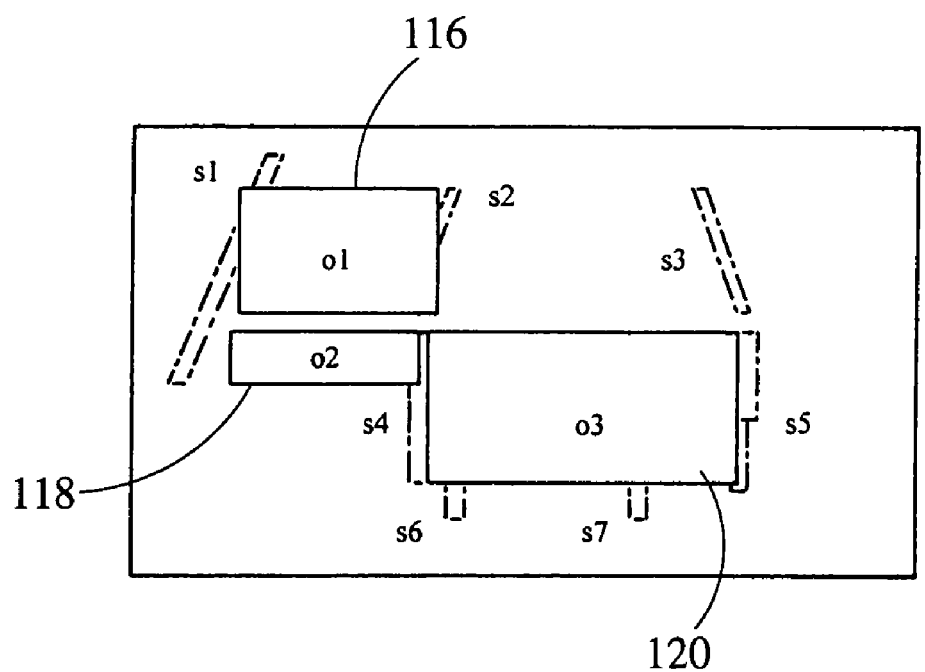
FIG. 10 is a view of the electronic image including objects constructed from the segments illustrated in FIG. 8.

Now referring to FIG. 10, objects may be constructed from two segments. Typically, a positive segment would be paired with a negative segment. Segment 42 and segment 44 are combined to construct object 56. Segment 42 and segment 46 are combined to construct object 58. In segment 46 and segment 52 are combined to construct object 60.

The characteristics of each object will then be evaluated by the characteristics of a model vehicle. A model is selected for each object based on the width of the object. For example, if the object width is smaller than a first width threshold a model corresponding to a motorcycle will be used to evaluate the object. If the object width is larger than the first width threshold but smaller than a second width threshold, a model corresponding to a Sedan is used. Alternatively, if the object width is greater than the second width threshold, the object is evaluated by a model corresponding to a large truck. While only three models are discussed here, a greater or smaller number of models may be used.

Each model will have different characteristics from the other models corresponding to the characteristics of a different type of vehicle. For instance, the vertical-lateral ratio in the Motorcycle model is high, but the vertical-lateral ratio in the Sedan model is low. These characteristics correspond to the actual vehicle, as the motorcycle has a small width and large height, but the sedan is opposite. The height of the object is quite large in Truck model but small in the Sedan model. The three models allow the algorithm to accurately assign points to each of the objects.

The characteristics of the objects are compared with the characteristics the model. The closer the object characteristics meet the model characteristics the higher the score will be, and the more likely the object is a vehicle of the selected model type. Certain characteristics may be weighted or considered more important than other characteristics for determining if the object is a vehicle. Using three models enables more precise judgment than a single model, because the three types of vehicles are quite different in the size, height, shape and other criteria necessary for identifying the vehicle. These three models also contribute to an improvement in the range accuracy of the algorithm.

Figure 11:
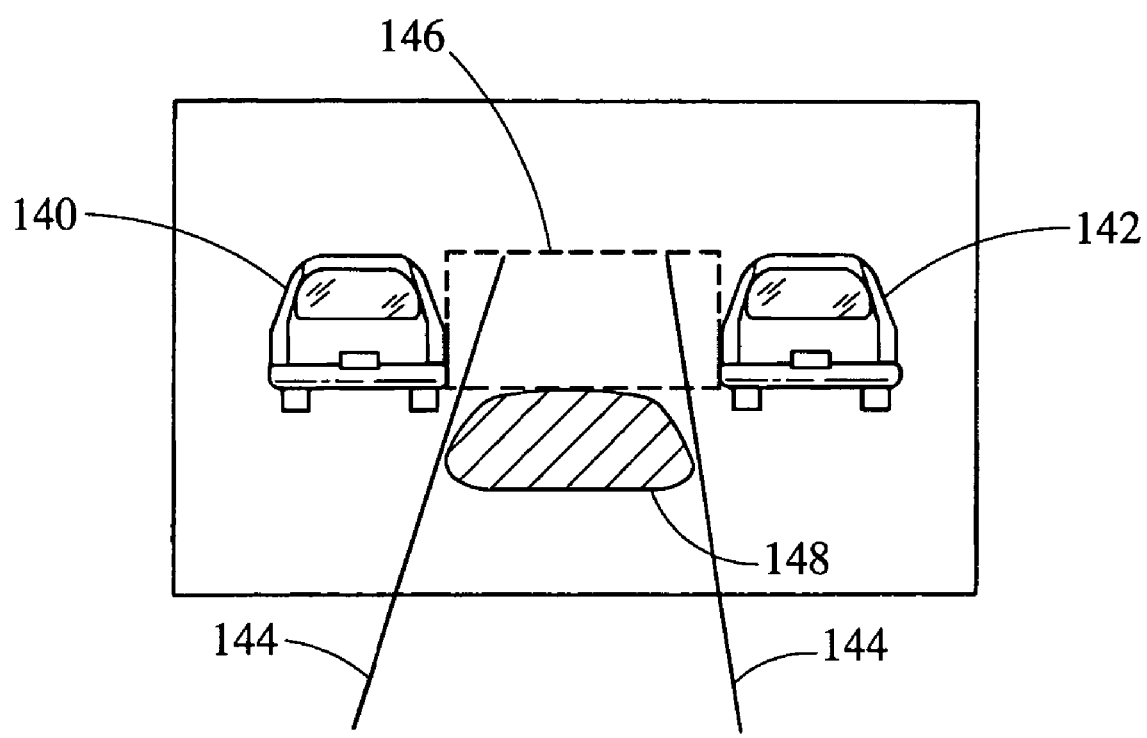
FIG. 11 is a view of the electronic image illustrating the regions that are checked for uniformity.

In addition to the edge-enhanced image, a binary image of the original captured image is used to improve the judgment whether an object is a vehicle or not. As shown in FIG. 11, when an empty space exists between two vehicles 140, 142 and the width of the space is almost the width of a vehicle, the algorithm may determine that the left edge of the right vehicle 142 and the right edge of the left vehicle 140 are the edges of a vehicle (ghost vehicle). However, the uniformity in the object region 146 between the vehicles 140, 142, and the ground region 148 directly in front of the object region 146 will likely be different if a vehicle is present than in a ghost vehicle situation. The binary image allows the algorithm to quickly quantify the uniformity in both the object region 146 and the ground region 148. An analysis of the uniformity in the two regions 146, 148 enables improved discrimination between the true and ghost objects.

Similar to the edge enhanced image, the captured image is binarized, meaning each of the pixels are set to a 1 or 0 value. A typical method for binarizing the image includes taking the absolute value of each pixel value and applying a threshold value, where if the brightness of the pixel value is above the threshold value, the pixel value is set to 1. Otherwise, the pixel value is set to 0. Other more complicated thresholding methods are also contemplated, including local area thresholding or other commonly used approaches.

The uniformity is then calculated in both the object region 146, and the ground region 148 is calculated. The uniformity is calculated according to the relationship defined in Eq. (1).

$$\text{Uniformity} = (|\text{percent of black pixels in the region} - 50|)/50 \quad (1)$$

$$0 < \text{Uniformity} < 1 \quad (2)$$

The uniformity of the binary image in an object region created by a ghost vehicle is usually very high. For instance, the object area corresponding to a truck is large and uniform. The weight of the points given to the uniformity characteristic in Truck model should be set high, as most trucks are large and uniform, but the weight given to the uniformity characteristic in a Motorcycle model should be low since it is small and may include many regions of varying brightness including painted and chrome parts. The uniformity characteristic is particularly useful in crowded traffic.

The uniformity in the lower part of the ground region is also very useful to judge the existence of a vehicle. The separation of the vehicles is usually wider than the width of a vehicle. This large separation means that the ghost-vehicle or object region 146 as shown in the picture will be located away from the bottom of the window. The location of the object region 146, creates a wide and uniform area overlapping with the ground region 148, in front of a ghost-vehicle.

Each of the objects are then scored based on characteristics of the object, including the width of the object, the height of the object, the position of the object relative to the bottom edge of the window, the segment width, the segment height, the uniformity of the object region, and the uniformity of the ground region. The above process is repeated for multiple windows with different target ranges.

The object with the best score is compared with a minimum score threshold. If the best score is higher than the minimum score threshold the characteristics of the object are used to determine the object's range and lateral position.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A system for determining range of a vehicle, the system comprising:

a camera configured to view a region of interest including the vehicle and generate an electrical image of the region;

a processor in electrical communication with the camera to receive the electrical image, wherein the processor is configured to create an edge enhanced image and construct a plurality of objects indicative of potential vehicle locations from the edge enhanced image, and wherein each object of the plurality of objects is analyzed based on a model of a plurality of models to determine a score for each object, the range of the vehicle being determined based on the object with the best score.

2. The system according to claim 1, wherein the processor is configured to identify a plurality of windows within the electrical image, each window of the plurality of windows corresponding to a predetermined physical size at a target range from the camera, the processor being further configured to evaluate characteristics of the electrical image in relation to each window to identify the vehicle.

3. The system according to claim 2, wherein the objects are constructed from edge segments generated based on the enhanced edge image.

4. The system according to claim 3, wherein the edge segments are vertical edge segments.

5. The system according to claim 3, wherein the score is based on a height of the edge segments.

6. The system according to claim 3, wherein the score is based on a width of the edge segments.

7. The system according to claim 1, wherein the score is based on a height of the objects.

8. The system according to claim 1, wherein the score is based on a width of the objects.

9. The system according to claim 1, wherein the processor is configured to generate a trinary image based on the edge enhanced image.

10. The system according to claim 9, wherein positive edge elements are identified by applying a predefined upper threshold to the edge enhanced image.

11. The system according to claim 9, wherein negative edge elements are identified by applying a predefined lower threshold to the edge enhanced image.

12. The system according to claim 9, wherein the objects are constructed from at least one positive and at least one negative edge segment generated from the trinary image.

13. The system according to claim 1, wherein the score is based on uniformity of the electrical image.

14. The system according to claim 1, wherein the processor is configured to generate a binary image based on the electrical image.

15. The system according to claim 14, wherein the processor is configured to calculate a uniformity of the binary image.

16. The system according to claim 15, wherein the processor is configured to calculate the uniformity according to the relationship: Uniformity =(|percent of black cells in a window −50|)/50.

17. The system according to claim 15, wherein the uniformity is calculated over an object region.

18. The system according to claim 15, wherein the uniformity is calculated over a ground region.

19. The system according to claim 1, wherein one of the plurality of models corresponds to a motorcycle.

20. The system according to claim 1, wherein one of the plurality of models corresponds to a sedan.

21. The system according to claim 1, wherein one of the plurality of models corresponds to a large truck.

22. The system according to claim 1, wherein one of the plurality of models corresponds to a bus.

* * * * *

UNITED STATES PATENT AND TRADEMARK OFFICE
CERTIFICATE OF CORRECTION

PATENT NO. : 7,561,721 B2  
APPLICATION NO. : 11/049502  
DATED : July 14, 2009  
INVENTOR(S) : Shunji Miyahara Page 1 of 1

It is certified that error appears in the above-identified patent and that said Letters Patent is hereby corrected as shown below:

On the Title Page

Item (75), replace "Yokohama" with --Yokohama-shi--.

Page 2, right column, line 35, under "OTHER PUBLICATIONS", replace "Jun. 221" with --Jun. 2001--.

Signed and Sealed this

Sixth Day of October, 2009

David J. Kappos  
*Director of the United States Patent and Trademark Office*